US007005981B1

(12) United States Patent
Wade

(10) Patent No.: US 7,005,981 B1
(45) Date of Patent: Feb. 28, 2006

(54) METHOD AND APPARATUS FOR THE EXTRACTION AND COMPRESSION OF SURVEILLANCE INFORMATION TO FACILITATE HIGH PERFORMANCE DATA FUSION IN DISTRIBUTED SENSOR SYSTEMS

(75) Inventor: Robert Wade, Branchville, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 129 days.

(21) Appl. No.: 10/709,724

(22) Filed: May 25, 2004

Related U.S. Application Data

(60) Provisional application No. 60/320,223, filed on May 27, 2003.

(51) Int. Cl.
*G08B 1/08* (2006.01)
*H04Q 7/00* (2006.01)

(52) U.S. Cl. ............................ 340/539.17; 340/539.16

(58) Field of Classification Search ........... 340/539.17, 340/539.16, 539.18, 539.22, 541; 375/240
See application file for complete search history.

(56) References Cited

U.S. PATENT DOCUMENTS

| | | | | |
|---|---|---|---|---|
| 4,593,274 | A * | 6/1986 | Rizzo | 340/539.17 |
| 6,393,056 | B1 * | 5/2002 | Talluri et al. | 375/240 |
| 6,646,676 | B1 * | 11/2003 | DaGraca et al. | 348/155 |
| 6,757,328 | B1 * | 6/2004 | Huang et al. | 375/240.1 |
| 6,954,142 | B1 * | 10/2005 | Lieberman et al. | 340/509 |
| 6,963,279 | B1 * | 11/2005 | Martinelli et al. | 340/539.22 |

* cited by examiner

*Primary Examiner*—John Tweel, Jr.
(74) *Attorney, Agent, or Firm*—John F. Moran

(57) ABSTRACT

A method and apparatus for the generic extraction and compression of surveillance information that facilitates high performance data fusion in distributed sensor systems. According to the method, multiple sensors (120[1] . . . 120[N]), distributed over a wide surveillance area (100), sense surveillance data of interest (310), optionally filter that sensed data (340), extract non-essential data (360) from the filtered data, compress in a manner specific to the extracted data (370) the extracted data for transmission and subsequently transmit (380) the compressed data to a "master" processing system (220) for integration/fusion with other transmitted compressed data streams originating from other sensors. Reductions in required data transmitted is on the order of 100:1.

17 Claims, 5 Drawing Sheets

METHOD AND APPARATUS FOR THE EXTRACTION AND COMPRESSION OF SURVEILLANCE INFORMATION TO FACILITATE HIGH PERFORMANCE DATA FUSION IN DISTRIBUTED SENSOR SYSTEMS

CROSS REFERENCE TO RELATED APPLICATIONS

This application claims benefit under 35 USC 199(e) of provisional application 60/320,223, filed May 27, 2003, the entire file wrapper contents of which provisional application are herein incorporated by reference as though fully set forth at length.

FEDERAL RESEARCH STATEMENT

The inventions described herein may be manufactured, used and licensed by or for the U.S. Government for U.S. Government purposes.

BACKGROUND OF INVENTION

1. Field of the Invention

This invention relates generally to the surveillance of one or more objects over a surveillance area. More particularly, it relates to methods and apparatus for the generic extraction and compression of surveillance data acquired from multiple sensors operating over a surveillance area that facilitate the fusion of such data into more useful or otherwise actionable information.

2. Background of the Invention

Multi-sensor surveillance systems and methods are receiving significant attention for both military and nonmilitary applications due, in part, to a number of operational benefits provided by such systems and methods. In particular, some of the benefits provided by multi-sensor systems include: Robust operational performance is provided because any one particular sensor of the multi-sensor system has the potential to contribute information while others are unavailable, denied (jammed), or lacking coverage of an event or target; Extended spatial coverage is provided because one sensor can "look" where another sensor cannot; Extended temporal coverage is provided because one sensor can detect or measure at times that others cannot; Increased confidence is accrued when multiple independent measurements are made on the same event or target; Reduced ambiguity in measured information is achieved when the information provided by multiple sensors reduces the set of hypothesis about a target or event; Improved detection performance results from the effective integration of multiple, separate measurements of the same event or target; Increased system operational reliability may result from the inherent redundancy of a multi-sensor suite; and Increased dimensionality of a measurement space (i.e., different sensors measuring various portions of the electro-magnetic spectrum) reduces vulnerability to denial (countermeasures, jamming, weather, noise) of any single portion of the measurement space.

These benefits, however, do not come without a price. The overwhelming volume and complexity of the disparate data and information produced by multi-sensor systems is well beyond the ability of humans to process, analyze and render decisions in a reasonable amount of time. Consequently, data fusion technologies are being developed to help combine various data and information structures into form(s) that are more convenient and useful to human operators.

Briefly stated, data fusion involves the acquisition, filtering, correlation and integration of relevant data and/or information from various sources, such as multi-sensor surveillance systems, databases, or knowledge bases into one or more formats appropriate for deriving decisions, system goals (i.e., recognition, tracking, or situation assessment), sensor management or system control. The objective of data fusion is the maximization of useful information, such that the fused information provides a more detailed representation with less uncertainty than that obtained from individual source(s). While producing more valuable information, the fusion process may also allow for a more efficient representation of the data and may further permit the observation of higher-order relationships between respective data entities.

Current systems and methods for multi-sensor surveillance have typically utilized sensor platforms or "node level solutions" that employ relatively powerful processors to determine the bulk of a target classification and tracking solution at a local surveillance node level. Typical sensor data fusion approaches in distributed sensor systems are low performance, and could be more accurately described as systems that share "pre-processed" data generated at the node level (such as target classification, range, or bearing).

There is a tendency to design system solutions in this manner in order to reduce the data transmission requirements between nodes or from the nodes to a central processor. Such system approaches have been difficult to develop and are not inherently flexible because of constant upgrades to node level processing and custom system level data fusion, which is inextricably related to custom hardware/software within the node. Accordingly, efficient data collection and high performance data fusion has not been realized in distributed sensor systems as a result of the inability to define a suitably flexible system solution and the inability to collect all sensor information from multiple sensor sites. Accordingly, systems and methods that provide multi-sensor surveillance, while simultaneously facilitating the data fusion from these sensors, are of great interest.

SUMMARY OF INVENTION

Such systems and methods that provide a highly flexible and efficient solution for collecting and transmitting sensor information from multiple sensors and multiple sensor types within a surveillance area, while simultaneously facilitating the theoretical limits of data fusion, are the subject of the present invention.

Viewed from a first aspect, the present invention describes methods for the generic extraction and compression of surveillance information, whereby multiple sensors, distributed over a wide surveillance area, sense surveillance data of interest, optionally filter that sensed data, extract non-essential data from the filtered data, compress in a manner specific to the extracted data the extracted data for transmission and subsequently transmit the compressed data to a "master" processing system for integration/fusion with other transmitted compressed data streams originating from other sensors.

Advantageously, the methods of the present invention are applicable to a wide variety of sensor types and data including: acoustic, seismic, magnetic, electro-magnetic, chemical or other types of sensors, either alone or in combination with like or unlike sensors. Additionally, as the methods provide a significant savings in communications requirements, they are applicable to a very large number of sensor(s) and sensor type(s), distributed across a wide geographic surveillance area. As a result, multi-sensor surveillance systems incorporating the methods will be highly scalable, thereby driving their applicability to a wide array of surveillance problems, while facilitating the potential for new and innovative data fusion techniques to be applied.

Viewed from another aspect, the present invention is directed to a system comprising multiple sensor-systems in communication with a master processing system. The sensor systems may be geographically remote to the master processing system. The sensor systems further include a sensor, for sensing surveillance data of interest, a filter for filtering the sensed surveillance data, and an extractor/compressor by which the filtered data has non-essential data extracted prior to compression by the compressor and subsequent transmission via a transmitter to the master processing system.

The master processing system receives the transmitted data from multiple sensors distributed throughout the surveillance area for integration/analysis/fusion and subsequent action.

BRIEF DESCRIPTION OF DRAWINGS

Various features and advantages of the present invention and the manner of attaining them will be described in greater detail with reference to the following description, claims and drawing in which reference numerals are reused—where appropriate—to indicate a correspondence between the referenced items, and wherein:

DETAILED DESCRIPTION

Figure 1:
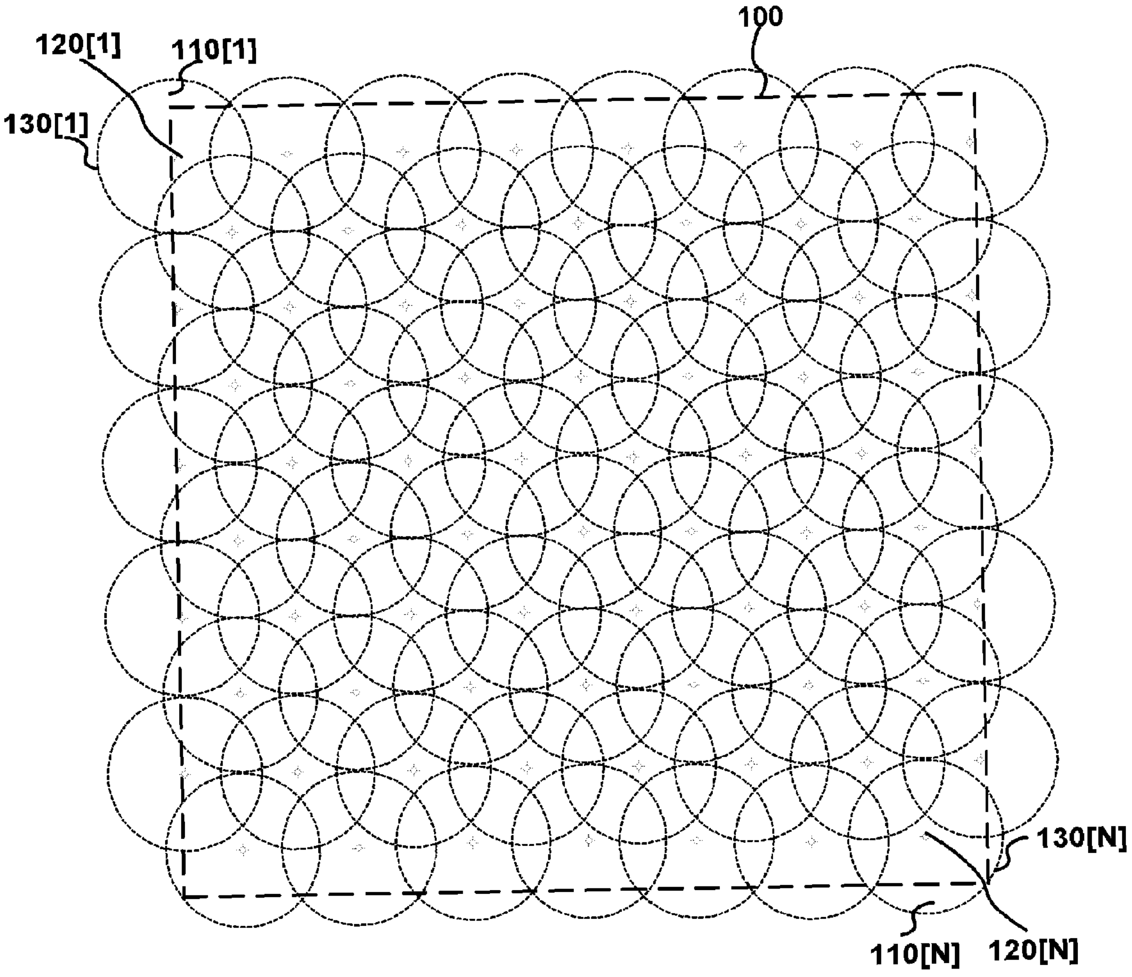
FIG. 1 is a schematic illustration of a surveillance area including a number of sensors according to the present invention.

FIG. 1 is a schematic illustration of a surveillance area that will serve as a starting point for a discussion of the present invention. In particular, and with reference to that FIG. 1, there is shown a surveillance area 100 having a plurality of sensor systems 120[1] . . . 120[N] situated therein. Each of the individual sensor systems 120[1] . . . 120[N] monitors a respective sensory area 110[1] . . . 110[N], each individual area being defined by sensory perimeter 130[1] . . . 130 [N], respectively.

With continued reference to FIG. 1, the sensory areas 110[1] . . . 110[N] are shown overlapping their respective adjacent sensory areas. While such an arrangement is not essential to the operation of a surveillance system or a surveillance system constructed according to the present invention, overlapping the sensory areas in this manner ensures that the entire surveillance area 100 is sensed by one or more individual sensor systems and that there are no "blind" areas within the surveillance area 100. Consequently, an object located anywhere within the surveillance area 100, that is the focus of a surveillance activity (not specifically shown in the FIG. 1, and hereinafter referred to as a "target"), may possibly be sensed by one or more of the sensor systems 120[1] . . . 120[N].

Advantageously, when multiple sensor systems are arranged in a manner like that shown in FIG. 1, even if a target moves within the surveillance area 100, it will be sensed by other subsequent sensor systems when that target is located within their respective sensory area(s). Additionally, when a target is sensed by multiple sensor systems because it is situated within overlapped sensory areas of multiple sensor systems the reliability of the sensed data may be improved as multiple, independent sensor systems provide their independent sensory data.

Importantly, while the FIG. 1 illustrates only a single sensor system (i.e., 120[1]) within a particular sensory area (i.e., 110[1]), it should be understood and appreciated by those skilled in the art that multiple sensor systems may occupy a single sensory area. Furthermore, the multiple sensor systems need not even be responsive to the same sensory stimulus. For example, a given sensory area could have sensor systems responsive to audible, vibrational, chemical, visual or non-visual stimulus, or a combination thereof. In this manner, a target that did not produce, for example, an audible signature may nevertheless produce a vibrational signature, capable of being detected by a vibrational sensor system. Still further, adjacent or overlapping sensory area(s) may have dissimilar sensor systems or sets of sensor systems, depending upon the design of the surveillance area and its sensory components and requirements.

Figure 2:
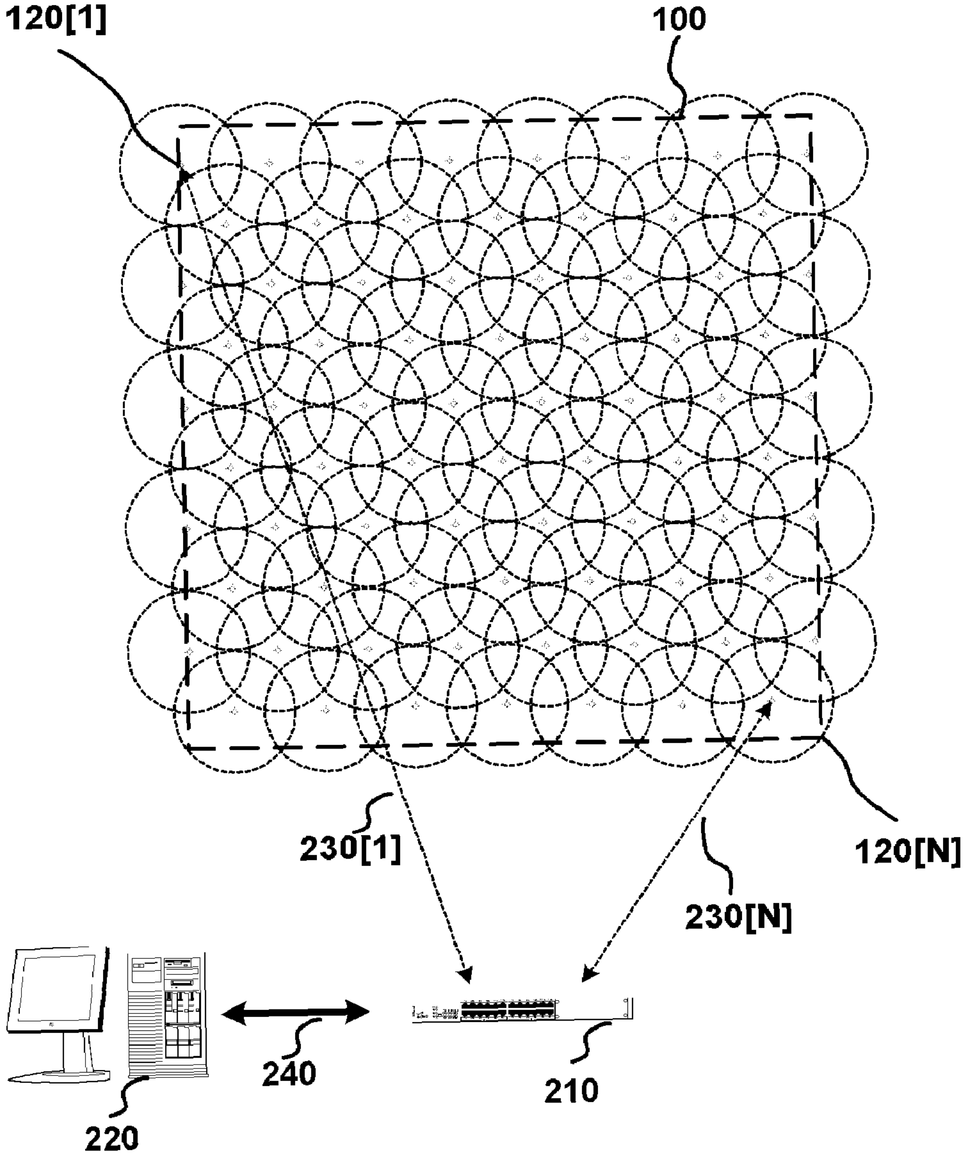
FIG. 2 is a schematic illustration of a surveillance system according to the present invention.

Turning our attention now to FIG. 2, there is shown a surveillance system according to the present invention. Specifically shown in FIG. 2, surveillance area 100 includes a plurality of sensor systems 120[1] . . . 120 [N], which are shown arranged in a manner consistent with that shown in FIG. 1.

Each of the sensor systems 120[1] . . . 120[N] is in communication with communications hub 210 via individual sensor communications links 230[1] . . . 230[N], respectively. It should be noted that for the sake of clarity, not all of the individual communications links are shown in the FIG. 2. Nevertheless, it is understood that one or more individual communications link(s) exist from an individual sensor system to the communications hub 210.

Further, such communications link(s) may be any one or a mix of known types. In particular, while surveillance systems such as those described herein are particularly well-suited (or even best suited) to wireless communications link(s), a given surveillance application may be used in conjunction with wired, or optical communications link(s). Advantageously, the present invention is compatible with all such links.

Of course, surveillance applications generally require flexibility, distributed across a wide geography including various terrain(s) and topographies. As such, wireless methods are preferably used and receive the most benefits from the employment of the present invention. Of particular importance to these wireless systems, is the very high transmission compression rates afforded, thereby allowing the maximum amount of data transmitted in a minimal amount of time. Such benefit(s), as will become much more apparent to the reader, facilitate scalability as additional wireless sensor systems may be incrementally added to an existing surveillance area as requirements dictate, and because sensory systems do not have to transmit for extended periods of time, power consumption is reduced and detectability (by unfriendly entities) of the sensor systems themselves is reduced.

The communications hub 210 provides a convenient mechanism by which to receive data streams transmitted from each of the sensor systems situated within the surveillance area 100. As can be appreciated by those skilled in the art, since the surveillance area 100 may include hundreds or more sensor systems, the communications hub 210 must be capable of receiving data streams in real time from such a large number of sensor systems. In the situation where different types of communications links are used between communications hub 210 and individual sensor(s) systems, the hub 210 must accommodate the different type of communications link or additional hub(s) (not specifically shown) which do support the different communications link(s) may be used in conjunction with hub 210.

As a further note, and as will be described in more detail later, the communications links 230[1] . . . . 230 [N] are preferably bi-directional such that configuration/command/control information may be provided to an individual sensor system from the master processing system 220. Typically, the uplink (master processing system to sensor system) need be of lower bandwidth than the downlink, as the volume of data sent in the uplink direction is usually much less.

As depicted in FIG. 2, the master communication link 240 provides a bi-directional communications path(s) between the master processing system 220 and the communications hub 210. Data received by the communications hub 210 via communications links 230[1] . . . 230[N] are communicated further to the master processing system 220 via the master communications link 240. Necessarily, the master communications link 240 in the downlink direction is of sufficient bandwidth to accommodate the aggregate traffic received by communications hub 210. Similarly, the uplink bandwidth of the master communications link 240 while typically much less than the downlink bandwidth must support any uplink communications from the master processing system 220 to the plurality of sensor systems situated in the surveillance area 100.

According to the present invention, master processing system 220 receives data from one or more sensors 120[1] . . . 120[N] positioned within the surveillance area 100 and further processes the received data thereby deriving further informational value. As can be appreciated, the data contributed from multiple sensor systems with the surveillance area 100 permits the operation of powerful "sparse arrays" of sensor systems, exhibiting much higher classification/tracking potential than existing systems.

In a preferred embodiment, and according to the present invention, the master processing system 220 offers equivalent functions of present-day, commercial computing systems. Consequently, the master processing system 220 exhibits the ability to be readily re-programmed, thereby facilitating the development of new data fusion methods/algorithms and/or expert systems to further exploit the enhanced data fusion potential of the present invention.

Figure 3:
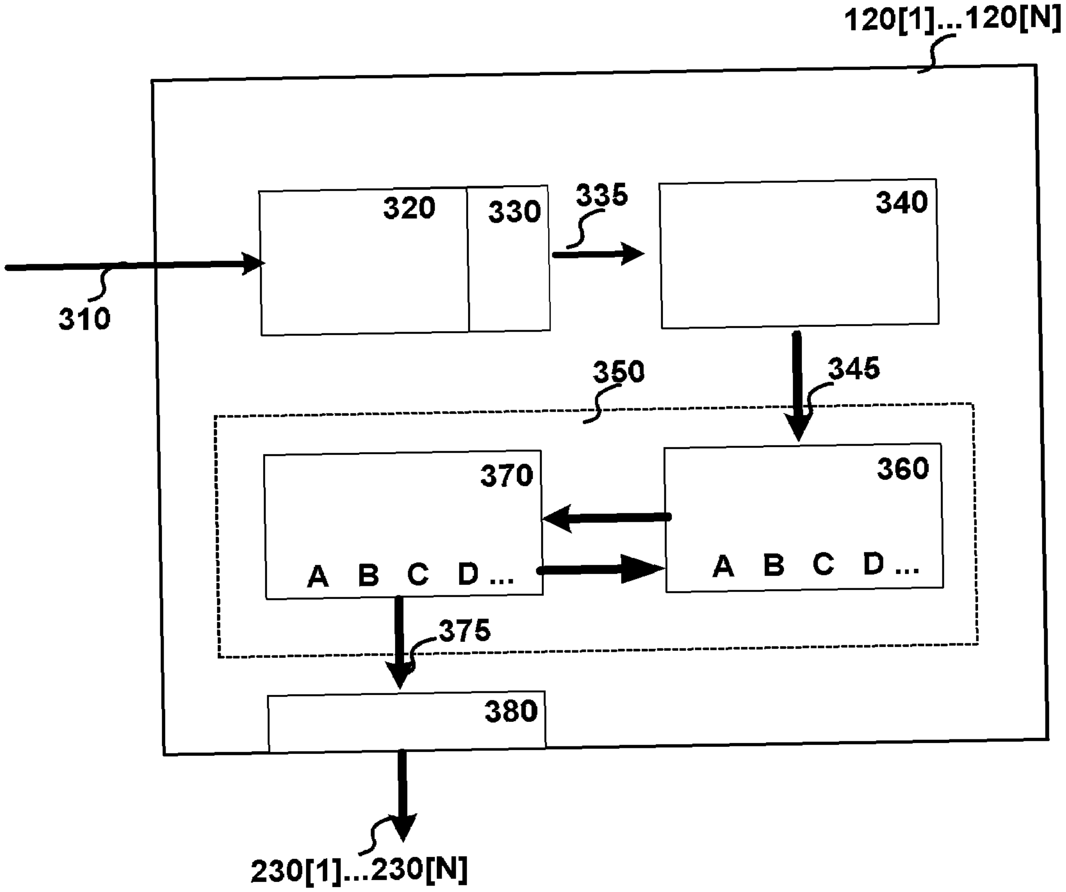
FIG. 3 is a block diagram of a generic sensor system according to the present invention.

Turning now to FIG. 3, there is shown in block diagram form a generic sensor system constructed according to the present invention. More specifically, the construction of sensor system 120[1] . . . 120[N] is like those shown in our discussion of earlier figures, namely FIGS. 1 and 2. In operation, a sensory input signal (stimulus) 310 is received by sensor element 320 of sensor system 120[1] . . . 120[N] producing a raw target signature (not specifically shown) which is operated on by analog/digital converter 330, thereby producing digital representation of raw target signature 335.

It is anticipated that the specific sensor element 320 which is used will depend upon the particular environment in which the sensor system 120[1] . . . 120[N] is deployed and the type/nature of the target being sensed. In particular, acoustic, seismic, thermometric, barometric, magnetic and photonic types of direct measurement sensors are all compatible with the inventive teachings of the present application. In addition, indirect sensors, i.e., certain types of magnetic, may be used to measure changes or disturbances in magnetic field that have been created or modified. Such measurements may be later used to derive information on properties direction, presence, rotation, angle or electrical currents. Finally, while our discussion so far has been limited to "passive" types of sensing, the present invention is not so limited. In particular, "active" types of sensing, i.e., RADAR, may be advantageously used with the present invention as well. In such situations, active elements (not shown in FIG. 3) may be incorporated to provide the active sense capability.

Continuing with the discussion of the sensor element 120[1] . . . 120[N] depicted in FIG. 3, the digital, raw target signature 335 is generically pre-processed, (i.e., spectral estimation, noise estimation, filtered). The pre-processed target signature 345 is then operated on by extractor/compressor 350.

Specifically, extractor 360 of extractor/compressor 350 receives the pre-processed target signature 345 and analyzes and "strips" or otherwise removes non-essential signal components from the pre-processed target signature 345 that do not aid in the "sensory purpose" of the surveillance system, i.e., target detection, classification or tracking. By way of example, and depending upon the type of target, sensory purpose of the surveillance system, and specific stimulus being sensed, the bandwidth may be reduced, the dynamic range may be reduced, or other(s) signal characteristics removed. As depicted in the FIG. 3, the particular extraction(s) performed (shown in the figure as "A B C D . . . " situated within extractor 360) is/are variable.

Subsequently, compression technique(s) are employed on the extracted signal 365, thereby reducing the total amount of data necessary to represent the extracted/compressed signal 375. This compression is performed by compressor 370, which, similarly to the variable extractions provided by the extractor 360, are also variable (shown in the figure as "A B C D . . . " situated within compressor 370). Advantageously, the particular type of compression used in a specific situation is dependent upon the extraction type performed by extractor 360. The process may be iterative, such that an extraction/compression combination is employed that is optimized for the particular type of sensor element 320.

The optimized, extracted/compressed data signal 375 is transmitted via transmitter 380 over communication a link 230[1] . . . 230[N] downstream to master processing system (FIG. 2 220). Transmitted data received from a plurality of sensor systems 120[1] . . . 120[N] are operated on by master processing system to derive information about the surveillance area 100 and any target(s) therein.

It is important to note that according to the present invention, each of the matched extraction/compression pairs, i.e., A—A, B—B, C—C, D—D, etc, is preferably optimized for a particular sensor type. As used herein, such optimization generally means that the extraction is "lossless", in which significant features of the sensor specific data are preserved, and the compression scheme employed provides the optimal compression for that sensor type/extraction. The result of this inventive notion is that for a particular sensor type, an optimal compression is employed thereby preserving bandwidth of the transmission facilities used.

By way of example, and to aid the reader in further understanding this matched, extraction/compression combination, we consider for a moment different types extraction/compression schemes which could be employed. For example, in MPEG for video, JPEG for still pictures, and MP-3 for audio, we find highly generic and powerful encoding/compression solutions which have become industry standards. Accordingly, analogous extraction/compression pairs (A—A, B—B, etc) are advantageously employed according to the invention for various sensor(s)/data i.e., acoustic, vibrational, magnetic, etc., and become highly flexible and robust solutions for feature analysis, compression, and transmission for each different sensor type (i.e., acoustic, seismic, magnetic, etc.) In a specific application to an acoustic distributed sensor system(s), several candidate "matched pairs" of efficient feature extraction/compression schemes have been realized which show high compression ratios. Overall compression ratios of 100:1 have been demonstrated and theoretical limits of 300:1 using near lossless compression are possible, while maintaining essential signal characteristics.

An important aspect of the present invention therefore, is that the sensory stimulus is efficiently distributed from multiple sensor systems distributed throughout a surveillance area to a master processor system for subsequent data analysis/fusion. Contributing to this inventive notion is a family of generic extraction/compression method pairs which are individually optimized for a particular sensor element type and their use results in very high overall data compression ratios while being low power/processing efficient.

At this point, if the present invention were applied to an acoustic surveillance system, more powerful beamforming techniques (a processing technique in which information from a number of microphones is combined to increase directionality, noise suppression and range of sensing) may be employed at the overall surveillance system level than can be achieved if sensory information were processed "locally" at each sensor site in a surveillance area. In particular, current schemes that attempt to effect high performance acoustic surveillance, typically employ expensive sensor arrays (a number of microphones, spread out over a very-limited geography) and similarly expensive local processing. In order to accomplish the beamforming, specific processing techniques must be designed exactly to the specific array design (number and dimensions of microphones). These multiple-microphone beamforming processing activities are inherently difficult to implement due to their complexity and power consumption thereby rendering them largely unavailable to remote, field surveillance areas.

In contrast, and according to the present invention, an exemplary acoustic surveillance capability does not require specialized or expensive remote field processing systems. Sensors may be individual microphones, as part of an efficient, low cost, small-sized unit. Sensor inputs are analyzed, encoded, and efficiently compressed for the transmission to a powerful master processing system, which then exploits the theoretical limits of data fusion. Furthermore, the individual sensor systems distributed throughout the surveillance area, need only transmit data to the master processing system when they are actually receiving a sensory stimulus. Of course, even when sensor activity is pronounced—according to the present invention non-essential signal components are extracted, and the extracted signal is then compressed in a particular manner such that the extraction/compression is optimized. Consequently, in the case of this acoustic surveillance example, more powerful beamforming techniques may be employed at the master processing system.

Additionally, by collecting and analyzing the TOTAL sensor information available from a surveillance area in a single master processing system, the ENTIRE surveillance area is constantly being surveilled, and more useful information may be derived. Overall sensor transmissions to the master processing unit can be reduced by taking advantage of the fact that the combination of MANY sensors inherently improves system performance when considering the advantage of a high performance system level data fusion solution to target classification and tracking. Consequently, the master unit may employ selective receipt of information from the sensor field, which could include turning certain sensors on and off or duty cycling.

Yet another characteristic of the invention emerges in the context of the acoustic beamforming example described above. In particular, the present invention provides the ability to generate or otherwise create "on the fly" sparse arrays within a sensor field or surveillance area. Such a feature would be extremely difficult or impossible with existing data acquisition surveillance methodologies that use preset algorithms or methods deployed in the field. Stated alternatively, by analyzing ALL of the data/information received from an entire surveillance area by a master processor, any combination of sensor systems may be used for sparse array beamforming. In particular, those sensor systems which are for example, the most efficient at a particular time/place for a particular target. With such a system, as taught by the present invention, a sparse array may be "constructed around" a target, as that target moves throughout the surveillance area.

Still another aspect of the present invention that can be readily appreciated by those skilled in the art, the use of feature extraction optimally matched with compression allows a very substantial reduction in the total amount of data transmitted from a sensor system to the master processing system. Reductions of 100 to 1, or more, are realizable with the present invention. Consequently, the master processing system, further facilitating the development and implementation of sophisticated data fusion methods and techniques receive a smaller volume of data. Of further advantage, the master processing system may direct specific sensor systems, which matched pair of extraction/compression techniques, are to be used, in real time, depending upon for example, the specific target being surveiled.

In addition to maximizing the potential development and application of data fusion techniques, a system constructed according to the teachings of the present invention should be highly scalable, as the significant reduction in data transmitted permits the addition of significant numbers of sensor systems to the surveillance system without exhausting available system resources. Lastly, the present invention should lead to further innovative designs of sensor systems, which are capable of supporting new sensor elements, without requiring hardware/software modification(s).

Figure 4A:
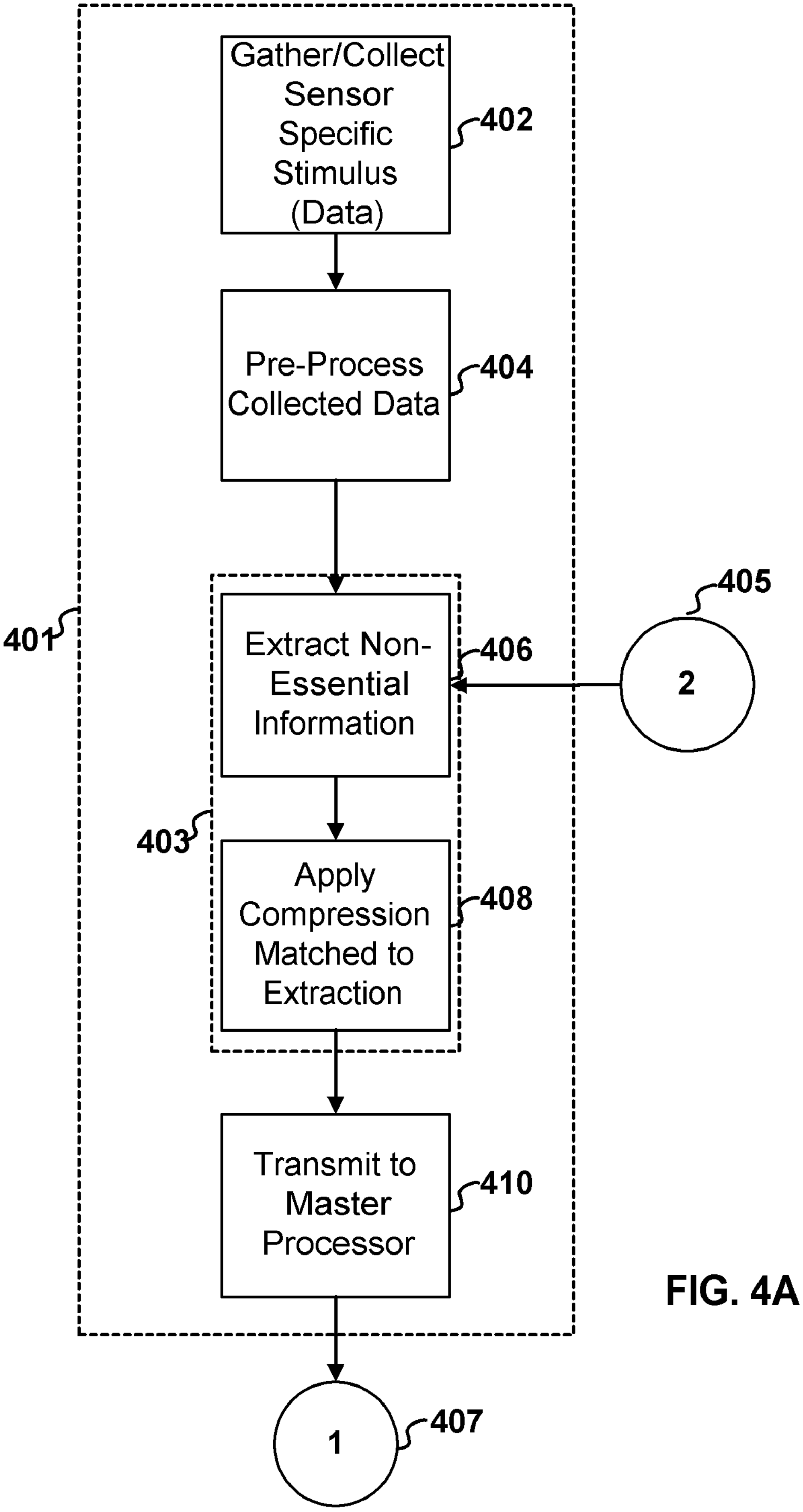
FIG. 4A is a flowchart depicting a sensory method operating in a sensor system, according to the present invention.

Turning our attention now to FIG. 4A, there is shown a flow chart depicting a sensor method according to the present invention. In particular, collective steps 401, are all performed within a sensory system, which is distributed throughout a surveillance area.

Sensor specific stimulus is received and data collected at step 402. That collected data is pre-processed at step 404 where it is converted from an analog sensor domain to a digital domain for further processing and transmission. The pre-processed, collected data is then treated by extraction/ compression matched pair 403, where non-essential signal information is first extracted (step 406) and then compressed (step 408) by a compression scheme matched to the extraction scheme. As noted in earlier discussions, the extraction/compression matched pair 403 is preferably optimally matched to the specific sensor type employed. This compressed data is then subsequently transmitted at step 410 to a master processor where it is received (along with other data streams from sensor systems throughout a surveillance area) for analysis/fusion.

Shown further in FIG. 4A, off-chart input 405, may provide specific direction to the sensory system from the master processor. In this manner, further refinement to the matched extraction/compression scheme may be provided from the master processor during a surveillance.

Figure 4B:
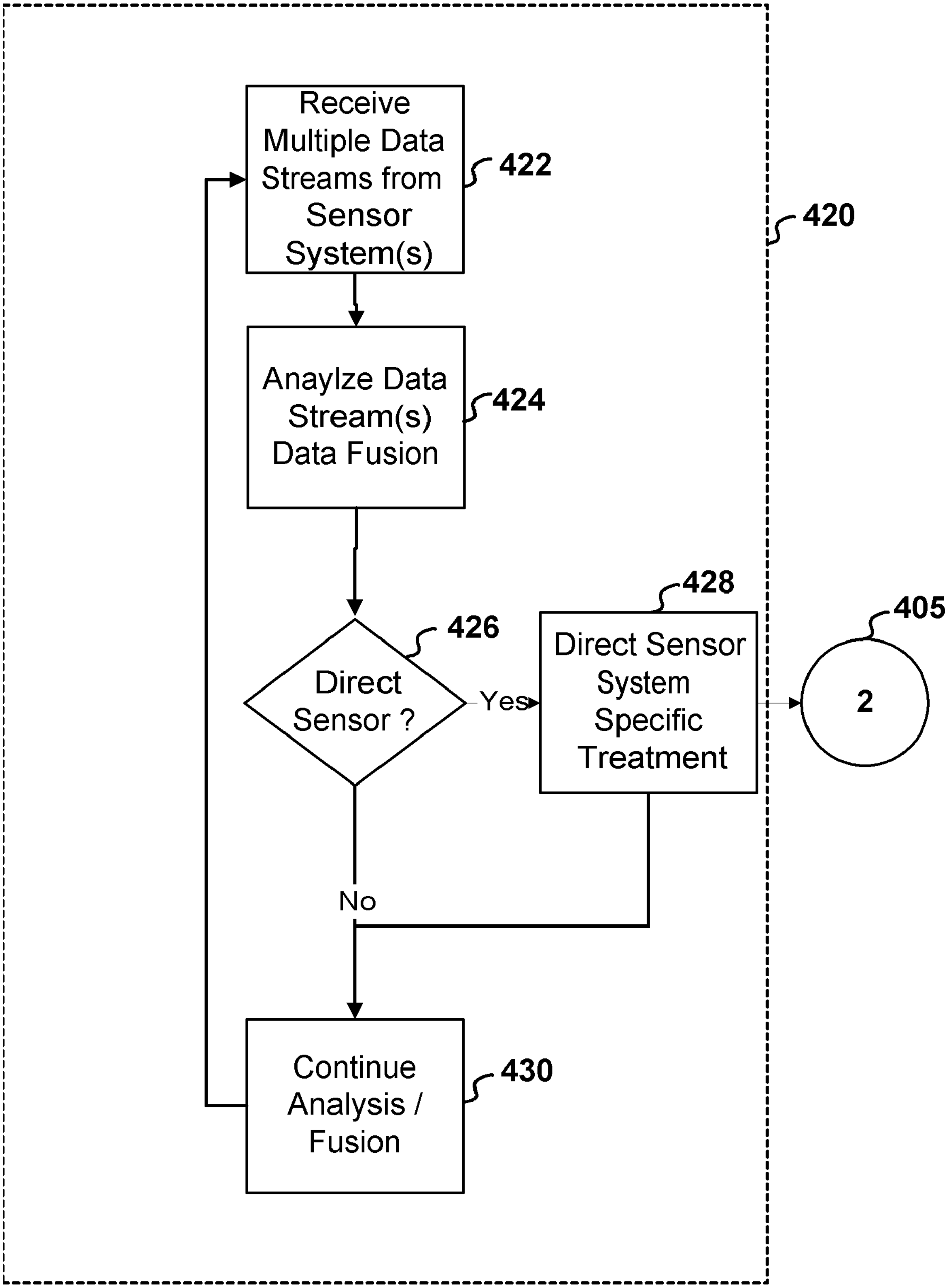
FIG. 4B is a flowchart depicting a processing method operating in a master processing system in conjunction with the method depicted in FIG. 4A, and according to the present invention.

Lastly, turning now to FIG. 4B, there is shown a flow chart depicting the master processor method that is matched to the sensor system method of FIG. 4A. In particular, collective steps 420 operate within a master processing system that first receives at step 422 multiple data streams from a number of sensor systems included in a surveillance area under interest. The collective data is analyzed or "fused" with one another at step 424.

Importantly, the data fusion/analysis process may cause some further direction of the sensor system(s) by the master processor. If, as determined at step 426, such further direction is required, it is performed at step 428 and out to sensor system(s) at block 405.

If no sensor system direction is required, then the master processing system continues with the analysis/fusion processes at step 430, and further continuing with the receipt of multiple data streams, step 422.

Of course, it will be understood by those skilled in the art that the foregoing is merely illustrative of the principles of this invention, and that various modifications can be made by those skilled in the art without departing from the scope and spirit of the invention. In particular, different sensor(s) and or master processor system combinations are envisioned. Additionally, alternative extraction/compression schemes will be developed, in addition to those already known and well understood. Accordingly, my invention is to be limited only by the scope of the claims attached hereto.

What is claimed is:

1. In a surveillance system comprising a master processing system and one or more sensor systems, said sensor systems being distributed throughout a surveillance area and in communications with the master processing system, a surveillance method comprising the steps of:

at the master processing system:

receiving data streams from the sensor systems;

analyzing the received data streams to determine characteristics of a target situated within the surveillance area; and repeating the above receiving and analyzing steps; and at the sensor systems:

collecting sensor specific stimulus (data);

pre-processing the collected data;

applying a matched extraction/compression scheme to the pre-processed data; and transmitting the extracted/compressed data to the master processing system.

2. The method according to claim 1 wherein the applying step comprises the steps of:

extracting non-essential information from the preprocessed data; and compressing using a compression scheme that is matched to the extraction, the pre-processed data having the non-essential information extracted.

3. The method according to claim 2, further comprising the steps of:

at the master processing system:

determining, based upon the analysis, whether additional information is to be provided by master processing system to a sensor system; and sending, based upon the determination, any additional information from the master processing system to the sensor system.

4. The method according to claim 1 wherein the transmitting from the sensor system to the master processing system is performed via a wireless communications link.

5. The method according to claim 1, wherein each of the sensor systems include a sensor, responsive to sensor specific stimulus, said sensor being one selected from the group consisting of: acoustic, magnetic, seismic, chemical, and photonic sensors.

6. The method according to claim 2 wherein said extraction and compression steps result in at least a 100:1 reduction in data.

7. The method according to claim 1 wherein said preprocessing step includes the step of:

converting, from an analog domain to a digital domain through the action of an analog/digital converter, the sensor specific data.

8. The method according to claim 3 wherein said determination is made as a result of a particular type of target surveiled.

9. The method according to claim 2 further comprising the steps of:

generating a sparse array of sensor systems from the one or more sensor systems distributed throughout the surveillance area.

10. The method according to claim 9 further comprising the steps of:

modifying the sparse array of sensor systems such that a new sparse array is generated from the one or more sensor systems distributed throughout the surveillance area.

11. Apparatus for the generic extraction and compression of information for surveillance to facilitate high performance data fusion in distributed sensor systems, said apparatus comprising:

a master processing system for receiving and processing one or more data streams transmitted from one or more respective sensor systems distributed throughout a surveillance area; and one or more sensor systems including:

a sensor, responsive to sensor-specific stimulus, producing a raw sensor data signal;

a pre-processor for processing the raw sensor data signal;

a matched extractor/compressor for further processing the pre-processed signal;

a transmitter for transmitting the further processed signal to the master processing system.

12. The apparatus according to claim 11 wherein the pre-processor further comprises:

an analog/digital converter for converting analog raw sensor data signal to a digital signal representative of the raw sensor data.

13. The apparatus according to claim 12 wherein the pre-processor further comprises:

one or more filters, for conditioning the digital signal.

14. The apparatus according to claim 13, wherein the extractor/compressor includes:

an extraction module for extracting non-essential information from the conditioned digital signal; and a compression module for compressing the data signal having the non-essential information extracted;

wherein the matched extraction/compression is optimally matched to the specific sensor type.

15. The apparatus according to claim 14 wherein the transmitter is a wireless transmitter.

16. The apparatus according to claim 15 wherein each of the sensor systems include a sensor selected from the group consisting of: acoustic, magnetic, seismic, chemical, and photonic sensors.

17. The apparatus according to claim 15 wherein the extractor/compressor produces at least a 100:1 reduction in data volume for transmission.

* * * * *